(12) United States Patent
Wescott et al.

(10) Patent No.: US 9,809,430 B2
(45) Date of Patent: Nov. 7, 2017

(54) SYSTEMS, DEVICES AND METHODS FOR CARRYING AND DEPLOYING SUBJECTS INTO INTENDED SPACES

(71) Applicants: James Edward Wescott, Taylorsville, KY (US); Kenneth Moran, Taylorsville, KY (US)

(72) Inventors: James Edward Wescott, Taylorsville, KY (US); Kenneth Moran, Taylorsville, KY (US)

(*) Notice: Subject to any disclaimer, the term of this patent is extended or adjusted under 35 U.S.C. 154(b) by 196 days.

(21) Appl. No.: 14/558,282

(22) Filed: Dec. 2, 2014

(65) Prior Publication Data
US 2016/0152453 A1  Jun. 2, 2016

(51) Int. Cl.
B66F 19/00 (2006.01)
B66D 3/04 (2006.01)
A62B 35/00 (2006.01)
F16M 13/02 (2006.01)

(52) U.S. Cl.
CPC ............ B66D 3/04 (2013.01); A62B 35/0037 (2013.01); F16M 13/022 (2013.01); F16M 13/027 (2013.01)

(58) Field of Classification Search
CPC .... B66D 3/04; A62B 35/0037; F16M 13/022; F16M 13/027
USPC .......... 294/191, 209, 22; 248/340, 322, 339; 24/457
See application file for complete search history.

(56) References Cited

U.S. PATENT DOCUMENTS

| | | | | |
|---|---|---|---|---|
| 163,003 A * | 5/1875 | De Leidi | ................... | B25B 9/00 15/104.32 |
| 334,667 A * | 1/1886 | Kircher | ...................... | B25J 1/04 294/22 |
| 858,492 A * | 7/1907 | Ward | ......................... | B25J 1/04 294/22 |
| 1,468,878 A * | 9/1923 | Donald | ..................... | B25J 1/04 294/22 |
| 3,314,636 A * | 4/1967 | McHugh | .................. | A63G 9/12 211/113 |
| 2012/0298813 A1* | 11/2012 | Gibbons | .............. | F16M 13/022 248/201 |
| 2013/0042958 A1* | 2/2013 | Spindler | ................... | F21S 4/10 156/66 |

* cited by examiner

Primary Examiner — Gabriela Puig
(74) Attorney, Agent, or Firm — Duncan Galloway Egan Greenwald, PLLC; Kevin T. Duncan

(57) ABSTRACT

The anchor and clevis system comprises a quick, tactical, and safe means to deploy a canine into an attic or other intended space to conduct a search and/or for the apprehension of a criminal suspect and comprises an anchor adapted to lock onto a support structure and a clevis attached to the anchor and threaded to accept a pole for remote deployment. Attached to the anchoring device by a carabiner is the top pulley. A lift rope is threaded through the top pulley allowing the user on the ground or lower floor to quickly lift a dog into an attic with minimal exposure to harm. The lift rope engages a lower pulley allowing a subject to be lifted by one user. Attached to the lower pulley by a second carabiner is a snap-shackle release system which allows the user to disengage the dog from the device remotely.

13 Claims, 6 Drawing Sheets

US 9,809,430 B2

SYSTEMS, DEVICES AND METHODS FOR CARRYING AND DEPLOYING SUBJECTS INTO INTENDED SPACES

FIELD OF THE INVENTION

The present invention concerns a method and system to deploy subjects remotely in law enforcement and search and rescue situations including dangerous environments. Subjects of the deployment are often trained animals not easily placed in desired locations. More specifically, the present invention and system provides a quick, tactical, and safe means to deploy a law enforcement or search and rescue canine (and accompanying equipment) into a desired location, e.g., an attic space, to conduct a search and/or for the apprehension of a criminal suspect.

BACKGROUND OF THE INVENTION

Approximately 15,000 law enforcement canine units presently operate in the United States alone. One of the inventors is an active police officer engaged in handling canines in law enforcement operations. These officers along with their canine partners are called upon routinely to search for evidence, to search for suspects, and at times to apprehend dangerous individuals in locations that present a wide range of dangers. The primary role of a canine unit is keeping officers safe and searching areas humans cannot readily access or must do so at great risk. Although a certain amount of risk is inherent in this line of work, mitigating or eliminating that risk is constantly on the mind of the officers, their families, and their departments.

One of the most dangerous situations an officer can encounter is an unknown threat in an attic or other location having an exposed point of entry and exit. As used herein, "attic" shall refer broadly to any location intended for deployment of a subject, such as a canine or other animal, presenting difficulty or danger for human access. Quite simply, there is no "safe" way to get into an attic and search it or to carry and deploy a canine for searching it. Attics and like locations present dangerous areas for a suspect to ambush officers. Canine units are often called upon to conduct these types of searches for many reasons. First, access to an attic can be challenging. Oftentimes, you will find an attic door in the top of a small closet or in the middle of a narrow hallway. Second, access to these attics may be in the form of a rickety attic ladder, or a step ladder found on the premise. Third, the attic space itself may be very low, not even allowing an officer to stand. Dogs are able to fit into much smaller spaces, defeating the first and third problems. But the problem remains getting the dog into the attic.

In operation, it is not an easy task for an officer to carry and lift up a canine into an attic. First you must remember this is not the family pet you are dealing with. In a tactical situation, the canine is "keyed up", meaning it is in work mode making it difficult and possibly dangerous to manage. Typically such dogs are not comfortable being carried much less being carried up a ladder it is not natural for the dog. Also, for the handler picking up an 80 pound animal trained and ready to fight is no easy task especially in a dynamic situation occurring around the dog in a law enforcement activity. There may be alarms going off, noise from the police radios, commands being shouted to the subject hiding in the attic, and numerous other background noises. Even without all of these variables, a handler must navigate a ladder while holding 80 pounds of canine while engaging a threat. There is no way to know which individuals are merely hiding in an attic, and which plan to use deadly force to keep from getting caught. How to manage climbing a ladder with a dog, then safely putting the dog on the floor of the attic without exposing the handler to the possible threat waiting at the top is a problem with no current reliable solution.

Presently, most officers must place themselves at greatest risk to deploy a tool designed to keep an officer safe. That tool is the dog. Officers will stick their heads into an attic opening and "take a quick look", before going back down and getting their dogs. Others wrestle their dogs up a ladder, risking back injury, frustration bites by the dog, and falls to both the handler and the dog. Others risk slipping into the attic and fashioning some "made on the spot" hoist system to raise the dog up into the attic where the dog can finally conduct a search. Another common solution is to place a dog on a level platform and wrestle the dog overhead, hoping he does not jump off in midair. This method takes hours of training, rehearsal and experience of numerous officers including the handler and the dog. Others just try to do a quick search themselves, leaving the dog out completely. The history of canine divisions is sadly filled with stories of officers who have been seriously injured or lost their lives using one of the techniques above.

What is needed is a deployment system that is portable, easy and safe to use, while being effective and versatile in operation.

SUMMARY OF THE INVENTION

The present invention provides a means to deploy a Law Enforcement or Search and Rescue canine into an attic space. Nothing presently available or known allows a dog to be deployed in a rapid and strategic manner to conduct a search or to apprehend a criminal suspect. The first benefit of this invention and system is the size and portability. The basic components of the invention are the custom claw anchor with attached clevis adapter and the canine harness modification bar. The system includes two carabiners, preferably two (or more) pulleys, and a snap-shackle. The recommended additions include approximately 50 feet of lift rope, 25 feet of release line, a threaded extension pole, and a two point canine harness. Everything except the pole can be easily carried in a small backpack or duffel bag. When called for an attic search, the officer can grab the bag, the pole, the dog and be ready to do the job in a quick and safe manner.

The second benefit to this invention and system is the ease of use coupled with speed of application. In a safe area, the officer will place the harness (or ballistic vest) and modification bar on the animal, with the snap-shackle and lower pulley attached to the release line already in place. The pole is inserted into the clevis adapter, already attached to the upper pulley and threaded with the lift rope. Now the officer can approach the area in a strategic manner. Once easily assembled, the officer uses the device attached to the pole to secure the system to the top rafters of the attic in one smooth, quick motion while remaining at a tactically sound distance. This step can even be completed from a position of concealment or cover. The alignment spring joining the clevis adapter and the anchor hold the unit in a steady position, but will allow movement and articulation to work the anchor onto a board if necessary. In one embodiment, the articulating clevis adapter allows any 2-inch board of an attic frame, even one set at an angle, to accept the custom claw anchor and its teeth will lock the device in place. Alternative embodiments of the articulating clevis and anchor assembly allow the invention to be deployed in connection with other board dimensions, i.e., other than 2-inch width boards, and other types of construction materials. In use, the invention may provide a system of clevis/anchor assemblies for selection in the field depending on the exposed construction members encountered. In such a system, the clevis/anchor assemblies are preferable designed for interchangeable use with a common extension pole. The pole is removed and the dog is lifted into the attic area using the lift rope in under 30 seconds. Once the dog has purchase on the attic floor, the officer pulls the release line, allowing the dog to conduct the search. Now the officers may enter the attic safely knowing the dog is already clearing the immediate area. Once the job is done, the device can even be used to safely lower the dog from the attic back to solid ground.

Another benefit of this invention and system is the adaptability. Attic access points come in many different shapes and sizes. Some are in a tight hall closet. Others may be in a storage room with an elevated ceiling. Basically, if the dog will fit through the attic opening and if you can access a 2" board of any width, you can use this system. The weight of the custom claw anchor with attached clevis adapter is less than 2 pounds, making this extremely light weight device easy to attach and lift with even the longest market ready threaded telescoping or extension pole. With the recommended lift rope length of 50', you could conceivably be as far as 25' away from the threat area while deploying the dog. The adjustment spring linking the custom anchor claw and the clevis adapter allows for instant articulation of the anchor to ensure a secure attachment, regardless of the angle of the wood. The device can handle more weight than will ever be found in a working dog. The invention and system could also be used in search and rescue applications to raise and lower a search dog or an injured dog in a safe and comfortable manner, sparing the handler avoidable back injury and/or fall risks. Finally, the custom clevis adapter and claw anchor have numerous attachment points for the user to add items such as a flashlight, a closed circuit camera, a recording device or any other small tool which may be necessary given the situation.

This system requires no expensive or cumbersome additions to a structure to work properly. No custom engineering of the site or power source is required. No ladder or secondary lift system is needed for the dog. A person can easily lift even a large dog with minimum injury risk. Once the job is finished, the system can be removed easily by hand, or by using the pole to give the clevis adapter a slight tap.

In a first embodiment, the present invention comprises an anchor assembly intended for locking engagement with an exposed building support frame member, the assembly comprising: a c-shaped anchor having an opening adapted to receive a frame member and a set of engagement teeth adapted to lockingly engage a surface of the frame member whereby the anchor when in an anchored position is adapted to support a subject; and a clevis attached at one end to the anchor, the anchor and clevis being attached so as to permit articulation of the anchor relative to the clevis, whereby with the clevis being positioned adjacent the frame member the anchor articulates to position the opening to receive the frame member and to engage the teeth with the surface of the frame member to achieve locking engagement of the anchor with the frame member.

The embodiment may further comprise a spring attached at one end to the anchor and at the opposite end to the clevis to hold the anchor in a first position and to allow with application of force the anchor to articulate to a second position during deployment of the assembly. The clevis may include a second end opposite the first end, the second end being adapted to fix the assembly to an extension pole for remote deployment of the assembly. The clevis may also comprise wherein the clevis second end is threaded to receive a matingly-threaded end of the extension pole or wherein the clevis first end is slotted to receive a portion of the anchor intended to serve as an articulating attachment point. The anchor assembly may further comprise wherein one or both of the anchor and the clevis includes a set of physical features for attaching other structures to the assembly for use in deployment. The set of teeth and opening of the anchor may further be adapted to permit disengagement of the anchor from the frame member and removal of the assembly for later deployments. The anchor may include an attachment point for connecting the assembly with a pulley system for lifting or lowering a subject.

In another embodiment, the present invention provides a system for deploying an anchor in locking engagement with an exposed building support frame member and for raising or lowering a subject to an intended space, the system comprising: a c-shaped anchor having an opening adapted to receive a frame member and a set of engagement teeth adapted to lockingly engage a surface of the frame member whereby the anchor when in an anchored position is adapted to support a subject; a clevis attached at one end to the anchor, the anchor and clevis being attached so as to permit articulation of the anchor relative to the clevis, whereby with the clevis being positioned adjacent the frame member the anchor articulates to position the opening to receive the frame member and to engage the teeth with the surface of the frame member to achieve locking engagement of the anchor with the frame member; a pulley attached to the anchor; and a lift line threaded through the pulley and having a means for connecting the lift line to a subject to be lifted or lowered after the anchor is placed in an anchored position.

The system may further comprise a spring attached at one end to the anchor and at the opposite end to the clevis to hold the anchor in a first position and to allow with application of force the anchor to articulate to a second position during deployment of the assembly. The clevis may include a second end opposite the first end, the second end being adapted to fix the assembly to an extension pole for remote deployment of the assembly. The clevis second end may be threaded to receive a matingly-threaded end of the extension pole. The clevis first end may be slotted to receive a portion of the anchor intended to serve as an articulating attachment point. The system may further comprise wherein one or both of the anchor and the clevis includes a set of physical features for attaching other structures to the assembly for use in deployment. The system may further comprise wherein the set of teeth and opening of the anchor are adapted to permit disengagement of the anchor from the frame member and removal of the assembly for later deployments. The anchor may include an attachment point for connecting the assembly with a pulley system for lifting or lowering a subject. The system may further comprise a subject harness modification support bar adapted to support the subject and connect the subject to the lift line. The system may further comprise a snap-shackle connected to the anchor and a release line connected to the snap-shackle. The snap-shackle may include a release pin connected to the release line, whereby with the subject deployed to a space of interest a user may pull on the release line to cause the release pin to free the subject from the pulley system.

The present invention and system provides a quick, tactical, and safe means to deploy a Law Enforcement or Search and Rescue canine into an attic space to conduct a search and/or for the apprehension of a criminal suspect. The invention and system includes a custom claw anchor capable of locking onto any 2" board, typically used to build the rafter systems of attic spaces. A custom clevis adapter attached to the anchor is threaded to accept any standard broom, mop, extension or telescoping pole. This allows the user to remotely attach the anchor to the attic's rafter system. Also attached to the anchoring device by a carabiner is the top pulley. The lift rope is threaded through this top pulley and allows the user on the ground to quickly lift a dog into an attic with minimal exposure to the suspect. The lift rope adjoins the lower pulley to the lift system, enabling even an aggressive dog to be safely and easily lifted by one user. Attached to the lower pulley by a second carabiner is a snap-shackle release system which allows the user to disengage the dog from the device remotely once the canine has reached the floor of the attic. The release is achieved by pulling on the release line.

The invention and system also includes an optional canine harness modification bar which will fit most currently available canine harnesses and/or ballistic vests with dual attachment points. This bar attaches to the harness and to the snap-shackle device and allows the dog to be raised and lowered in a level position. This will reduce stress on the animal's shoulder and hip joints. The modification bar comes with numerous machined attachment points which can be used as needed for a particular situation and/or canine.

The custom claw anchor has been designed to allow a user to add features such as a flashlight or a camera, as needed for a particular situation. The type of pulley and style of rope threaded into this invention and system can be changed, based upon the needs of the user. (For example, a double pulley system will increase the leverage of lifting the dog from the ground into the attic. Also, a "smoother" rope will pull more quickly than a rough textured rope).

The present invention provides a quick, tactical, and safe means to deploy a law enforcement or search and rescue canine into an attic space to conduct a search or for the apprehension of a criminal suspect. More particularly, the present invention allows a dog to be deployed into an attic or other intended space in a manner having at least the following benefits over current deployment methods: 1) minimizes the exposure of the handler (officer) to a potentially deadly threat in an unknown area; 2) prevents the dog handler from having to carry the animal up a ladder thus exposing the handler to avoidable back injuries; 3) reduces the risk of injury for the handler from falls or frustration bites from the dog; 4) reduces stress on the dog; and 5) reduces the risk of injury to the dog from drops or falls.

BRIEF DESCRIPTION OF DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

DETAILED DESCRIPTION OF PREFERRED EMBODIMENT

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

Figure 1:
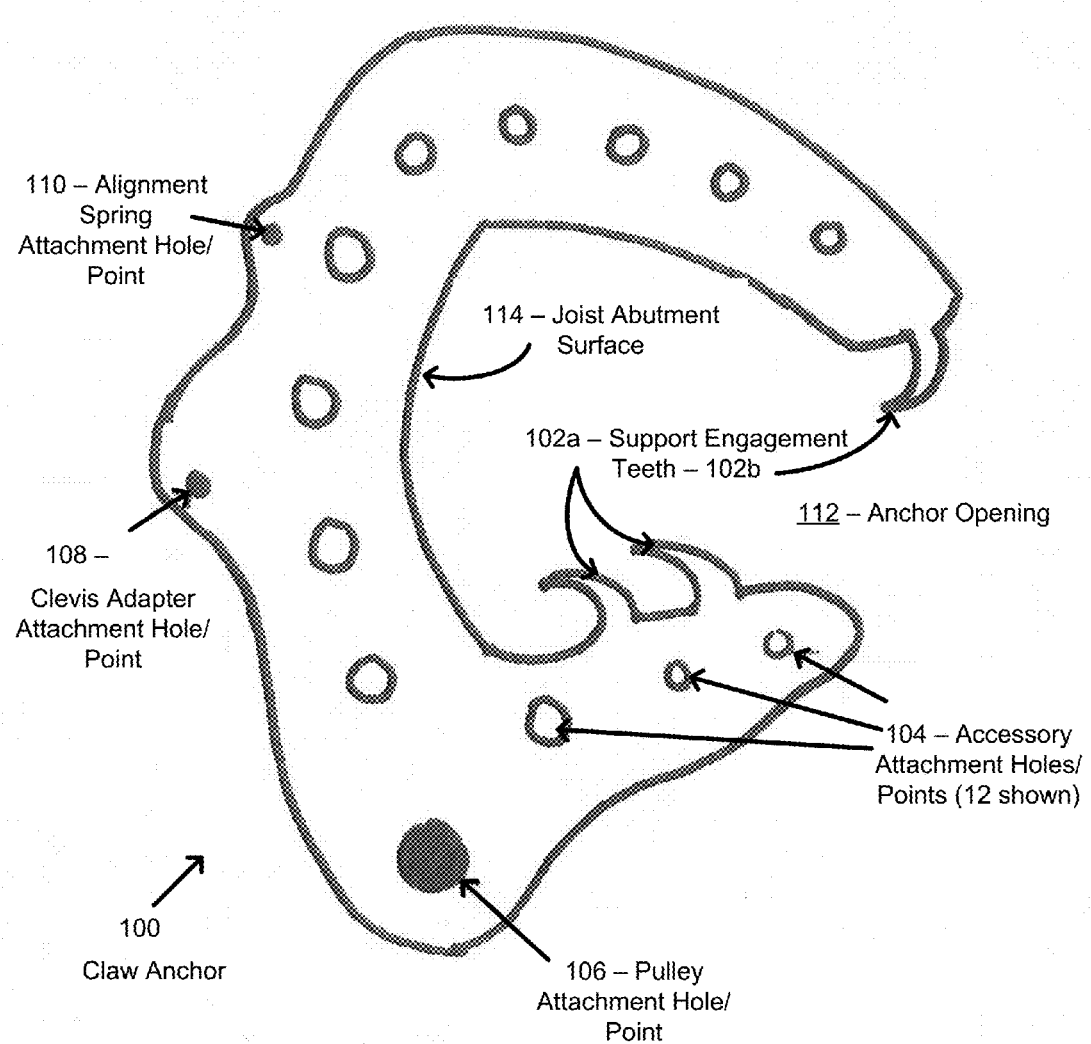
FIG. 1 is a side view of an embodiment of the anchor device used in connection with the subject deployment system of the present invention.
Figure 2:
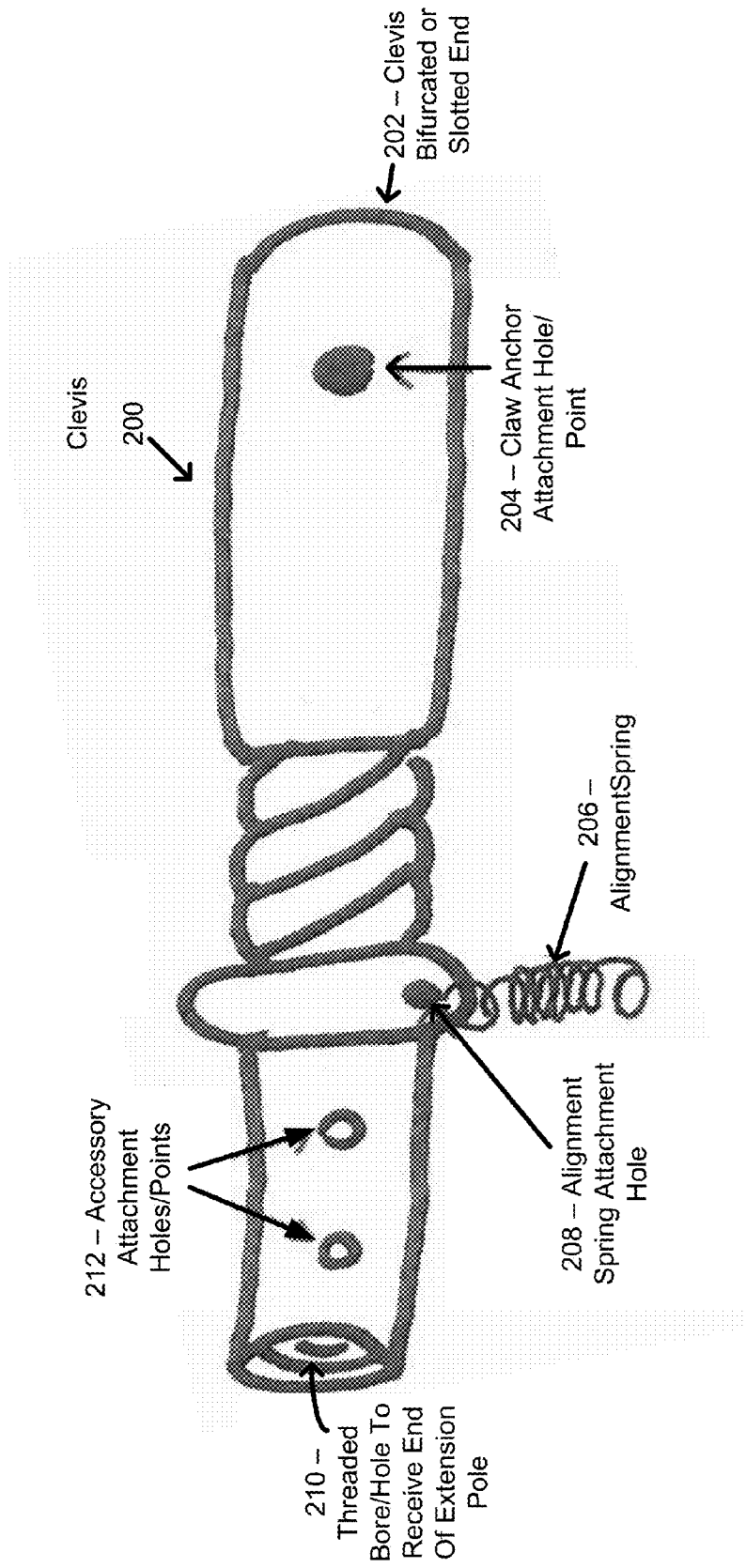
FIG. 2 is a side view of an embodiment of the clevis adapter device used in connection with the anchor device in the subject deployment system of the present invention.

FIG. 1 shows the claw anchor 100 in isolation and without assembly with a clevis adapter attachment described in FIG. 2. In this exemplary embodiment, the claw anchor 100 is a C-shaped metal part with three directional teeth 102*a/b*. The dimensions of opening 112 and directionality of teeth 102*a/b* and their spacing are adapted to provide the ability for the anchor 100 to receive and to "bite" or lock onto a length of construction lumber measuring two inches, e.g., 2×2, 2×4, 2×6, 2×8, or 2×10 inches, along joist abutment surface 114. In addition, the direction and shape of teeth 102*a/b* and configuration of joist abutment surface 114 are preferably adapted to allow for disengagement with the board or other fixed construction member at completion of the task following deployment. By simply forcing the anchor in a reverse rotation of deployment the teeth 102*a/b* are freed from the board and the anchor may be removed from the engagement for re-use.

Figure 5:
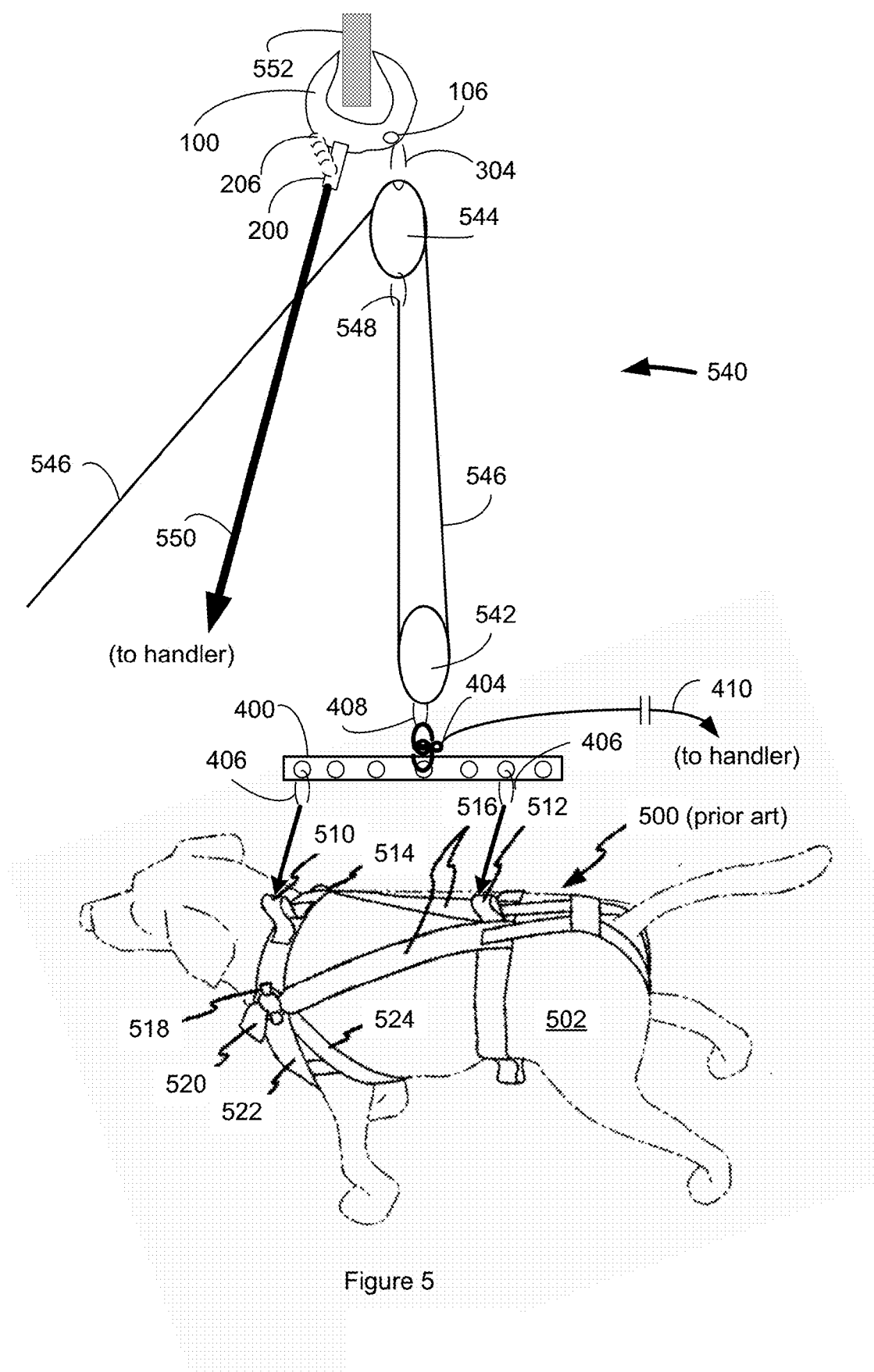
FIG. 5 is a schematic diagram illustrating one embodiment and intended application of the subject deployment system of the present invention.

In one manner of construction, anchor 100 is machined from a solid piece of ¼-inch metal. Anchor 100 is fabricated to have holes 104 (twelve in this example) that serve to 1) reduce the weight of the anchor 100 and therefore assembled product, while maintaining desired strength and other properties, and 2) provide attachment points for items such as a flashlight, a closed circuit camera, a recording device or any other small tool which may be required of the user given the situation. The holes 104 may be of different diameters and may be threaded and spread throughout the anchor to allow the user many options and locations for attaching items to this device. As shown in FIG. 5 and described in detail below, pulley attachment hole 106 is the point a carabiner 304 is used to attach an upper pulley 544 to the claw anchor 100. The clevis attachment hole 108 is the hole used to attach the clevis adapter 200 to the claw anchor 100 using, for example, a bolt and wing nut. The alignment spring hole 110 is the attachment hole used to attaché alignment spring 206 (FIG. 2) with anchor 100.

Figure 3:
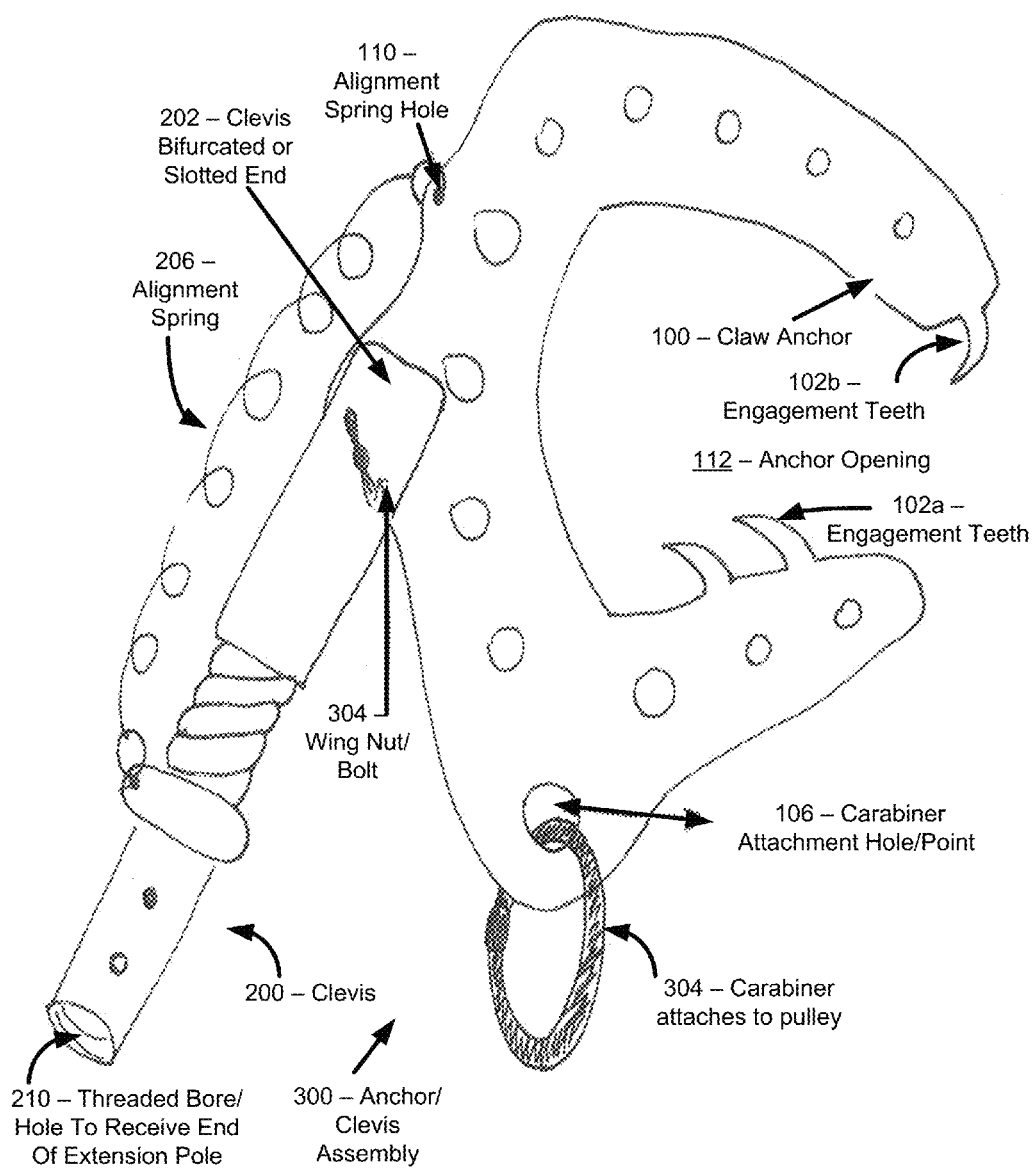
FIG. 3 is a side view of the anchor and clevis device assembly used in connection with the subject deployment system of the present invention.

FIG. 2 illustrates one embodiment of clevis adapter 200, the anchor attachment hole 204 is used to attach the clevis 200 to the anchor 100 at anchor hole 108 using, for example as shown in FIG. 3, a bolt and wing nut 304. The clevis 200 is bifurcated, slotted or split at end 202 to allow the clevis 200 to slip over the claw anchor 100 in the area around clevis adapter hole 108. The alignment spring 206 is attached to the clevis adapter 200 at hole 208 and the other end of the spring 206 is attached to the anchor 100 at hole 110. The female threaded end 210 of the clevis adapter 200 is preferably adapted to accept most standard male threaded broom, mop, extension or telescoping poles readily available and typically encountered by the users of the deployment device. In this manner, even if the pole breaks or becomes un-useable or is simply not present, the user can retrieve a pole often found in a residence, such as a broom pole, and fit the device to it for immediate use at that location. The threaded end 210 of the clevis adapter 200 boasts two attachment points 212 as shown for items such as a flashlight, a closed circuit camera, a recording device or any other small tool which may be useful given the situation.

FIG. 3 shows the claw anchor 100 assembled with attached clevis adapter 200 to form anchor/clevis assembly 300. As described above with reference to FIG. 1, the claw anchor 100 is C-shaped with an opening 112 formed to accept a board, e.g., 2-inch board commonly found in rafter construction, and is preferably made of metal with three directional teeth 112a/b used to engage with the relatively softer wood material of the board to anchor the device to the wood allowing for a weight supporting locked position. The exact dimensions of the opening 112 and number of teeth 102 a/b may vary keeping in mind that the overriding goal is to provide a device adapted to lockingly engage with a board or other building material to support the weight of an animal or subject intended to be raised or lowered into a space of interest while keeping the deploying officer or user remote from the space of interest. The carabiner attachment hole 106 is the point a large carabiner 304 is used to attach an upper pulley 544 (FIG. 5) to the claw anchor 100. As shown, the clevis adapter 200 is attached to the claw anchor 100 using a bolt and wing nut combination 304, or other provided attaching device such as a roll pin, and the alignment spring 206 is attached at attachment hole 110.

In one embodiment, the articulating clevis adapter 200 allows anchoring engagement with any exposed 2-inch board of an attic frame, even one set at an angle, to accept the custom claw anchor 100 through opening 112 and its teeth 102a/b will lock the assembly device 300 in place. Alternative embodiments of the articulating clevis and anchor assembly allow the invention to be deployed in connection with other board dimensions, i.e., other than 2-inch width boards, and other types of construction materials. In use, the invention may provide a system of clevis/anchor assemblies for selection in the field depending on the exposed construction members encountered. In such a system, the clevis/anchor assemblies are preferably designed for interchangeable use with a common extension pole.

Figure 4:
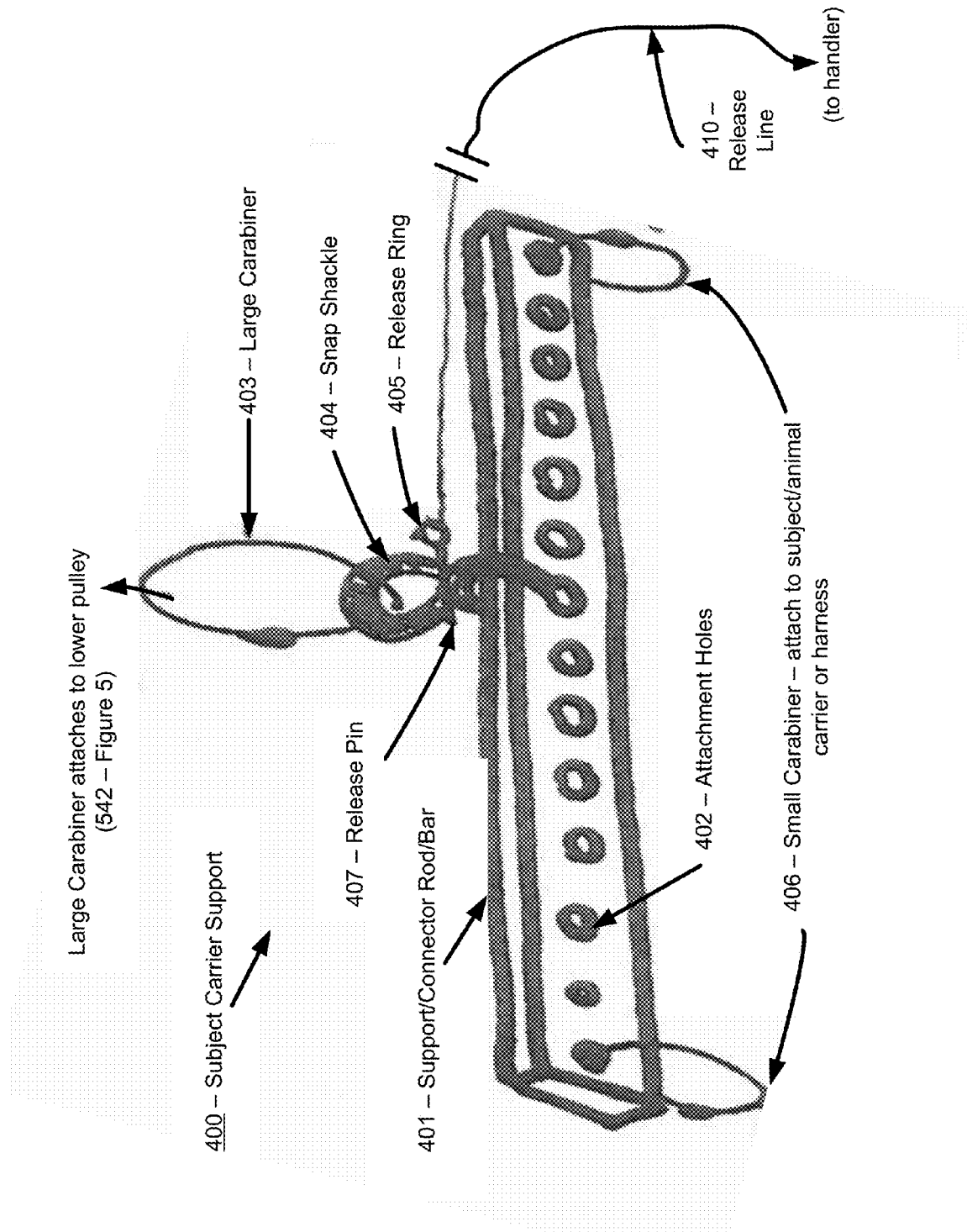
FIG. 4 is a side view of an embodiment of the subject harness modification bar used in connection with the subject deployment system of the present invention.

FIG. 4 shows an optional subject carrier support mechanism 400 including subject harness modification bar or rod 401. Support bar 401 is preferably configured to readily attach to commonly available dog harness or ballistic vest products. Such products typically include two connection points or straps. The support mechanism 400 provides stability when lifting the subject, e.g., a dog or canine, into a level position, while also reducing pain and discomfort of the dog. The bar 401 keeps the attachment points of the harness separated as the dog is lifted as illustrated in FIG. 5.

For example, the bar 401 is attached to a harness device 500 at loop 510 and loop 512 using two small carabiners 406. The bar 401 is attached to the subject deployment system 540 of FIG. 5 using the snap-shackle 404. A releasable pin 407 having ring 405 connects to a release line 410. A large carabiner 403 is used to attach the carrier support 400 to a lower pulley 542.

FIG. 5 shows an exemplary configuration or set-up of the present invention subject (canine) deployment system 540. As shown, a user operating system 540, such as a law enforcement canine handler, may be located at a preferred or safe position or area and has connected a harness (or ballistic vest) 500 and subject animal 502 to the harness modification bar 401. The rest of the system 540 as assembled requires only the snap-shackle 404 to be attached to the canine harness modification bar 401 before lifting the dog 502 into the intended deployment location, such as an attic of a house being searched. If the optional canine support mechanism 400 is not used, the snap-shackle 404 can be attached directly to the harness or vest 500 worn by the dog 502 before lifting the dog into the attic. While much of the description is expressed in terms of lifting an animal to a deployed location the invention is equally useful in lowering a subject from a raised position to a lower position, e.g., deploying a subject to a basement or lower floor or space.

In one exemplary manner of operating system 540, the claw anchor 100 attached to the clevis adapter 200 is deployed into the rafter system of an attic by a user standing or positioned on the floor below the attic or other preferred position. A telescoping or extension pole 550 (of user's preference) is inserted into or otherwise connected to the clevis adapter 200 at point 210 and is the mechanism of deployment and allows the human handler to be distanced from a potentially dangerous position or condition. Once the claw anchor 100 is locked into the fixed support structure 552, such as anchored to a wooden rafter, the pole 550 can be removed from clevis 200 and put out of the way. From the pulley/carabiner attachment hole 106 in the claw anchor 100, a large carabiner 304 attaches the top pulley 544 to the anchor 100. The lift rope 546 is threaded through the top pulley 544 and joins the lower pulley 542 to the system 540 and is secured at carabiner 548. One end of the rope 546 is held by the user. For instance, lift rope 546 is 50 feet in length and rated for at least double the weight of the heaviest subject to be lifted, e.g., weight of canine 502. Attached to the lower pulley 542 is a large carabiner 408, attached to the snap-shackle 404. On the snap-shackle 404 is a ring 405 attached to a release pin 407. The canine release line 410 is tied to release pin 407. In a typical deployment release line 410 is 25 feet in length when using a 50 foot long lift rope 546. The release line 410 is preferably markedly different in color and size to the lift line to avoid confusion.

The following describes an exemplary operation of the deployment system 540. The claw anchor 100 attached to the clevis adapter 200 is deployed into a rafter system of the attic by the user (e.g., police canine handling officer) standing on the ground floor or a floor below the attic level. The attic is to be searched for an assailant by the canine deployed using system 540 into the attic. A telescoping or extension pole 550 attached to the clevis adapter 200 is the means by which the anchor 100 device is deployed. The initial goal is to attach the claw anchor 100 to the attic rafter system (e.g., at support beam or joist 552) in an area near the edge of the opening of the attic. The claw anchor's directional teeth 102a/b lock securely onto an exposed two-inch piece of lumber in the attic's rafter system. The adjustment or alignment spring 206 linking the anchor claw 100 and the clevis adapter 200 allows for instant articulation of the anchor to ensure a secure attachment, regardless of the angle of the wood. Once the claw anchor 100 is locked onto the wood support member 552, the pole 550 may be removed and put out of the way. The user then ensures the dog 502 is safely attached to the snap-shackle 404 using either the canine harness modification support 400, or an attachment point on the dog's vest or harness 500. The user then holds the lift rope 546 and ensures the end of the release line 410 is at hand. Pulling firmly on the lift rope 546, the dog 502 is lifted into the air and raised into desired position. The dog 502 naturally seeks purchase (firm footing surface) to stand on. Once the dog 502 rises above the edge of the attic opening and places its feet on the attic floor, the user pulls the release line 410, thus freeing the dog for movement about the attic or intended space. Note that an optional line may be attached to the dog 502 (e.g., by bar 401) to restrict freedom of movement. The line may also be used to allow a handler to use the optional line in any of a variety of rescue operations.

Figure 6:
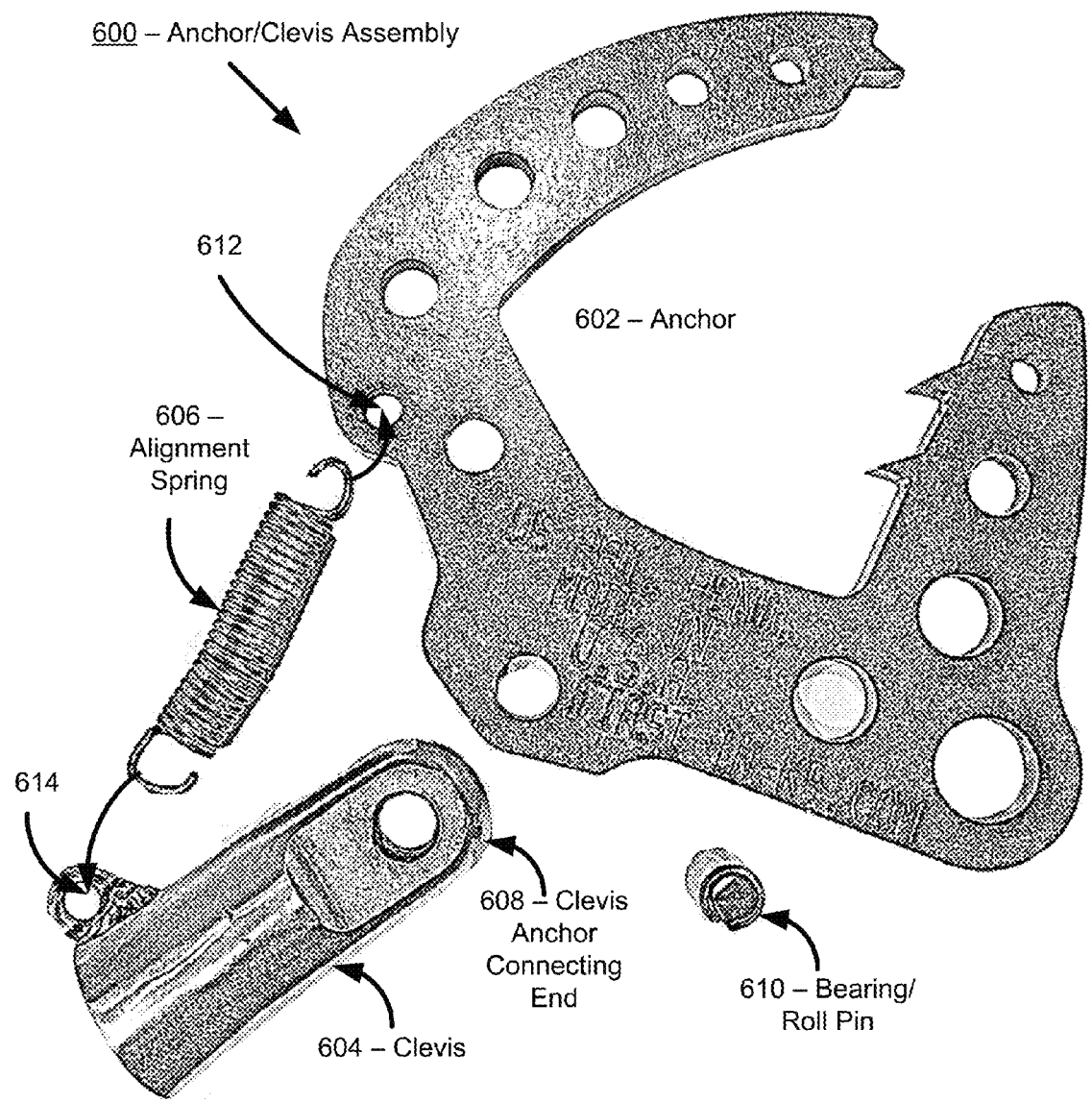
FIG. 6 is an exploded view of an alternative anchor and clevis device assembly used in connection with the subject deployment system of the present invention.

FIG. 6 shows an exploded view of an alternative anchor and clevis device assembly 600 used in connection with the subject deployment system of the present invention. The anchor and clevis device assembly 600 comprises an anchor 602, clevis 604, alignment spring 606, clevis anchor connecting end 608, and bearing/roll pin 610. The bearing/roll pin 610 secures the clevis 604 to the anchor 602 at the clevis anchor connecting end 608. The alignment spring 606 connects to the clevis 605 at point 614 and to the anchor 602 at point 612.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed:

1. An anchor assembly intended for locking engagement with an exposed building support frame member, the assembly comprising:
   a c-shaped anchor having an opening adapted to receive a frame member and a set of engagement teeth adapted to lockingly engage a surface of the frame member whereby the anchor when in an anchored position is adapted to support a subject;
   a clevis attached at one end to the anchor, the anchor and clevis being attached so as to permit articulation of the anchor relative to the clevis, whereby with the clevis being positioned adjacent the frame member the anchor articulates to position the opening to receive the frame member and to engage the teeth with the surface of the frame member to achieve locking engagement of the anchor with the frame member; and
   a spring attached at one end to the anchor and at the opposite end to the clevis to hold the anchor in a first position and to allow with application of force the anchor to articulate to a second position during deployment of the assembly.

2. The anchor assembly of claim 1, wherein the clevis includes a second end opposite the first end, the second end being adapted to fix the assembly to an extension pole for remote deployment of the assembly.

3. The anchor assembly of claim 2, wherein the clevis second end is threaded to receive a matingly-threaded end of the extension pole.

4. The anchor assembly of claim 2, wherein the clevis first end is slotted to receive a portion of the anchor intended to serve as an articulating attachment point.

5. The anchor assembly of claim 1, wherein one or both of the anchor and the clevis includes a set of physical features for attaching other structures to the assembly for use in deployment.

6. The anchor assembly of claim 1, wherein the set of teeth and opening of the anchor are adapted to permit disengagement of the anchor from the frame member and removal of the assembly for later deployments.

7. The anchor assembly of claim 1, wherein the anchor includes an attachment point for connecting the assembly with a pulley system for lifting or lowering a subject.

8. An anchor assembly intended for locking engagement with an exposed building support frame member, the assembly comprising:
   a c-shaped anchor having an opening adapted to receive a frame member and a set of engagement teeth adapted to lockingly engage a surface of the frame member whereby the anchor when in an anchored position is adapted to support a subject;
   a clevis attached at one end to the anchor, the anchor and clevis being attached so as to permit articulation of the anchor relative to the clevis, whereby with the clevis being positioned adjacent the frame member the anchor articulates to position the opening to receive the frame member and to engage the teeth with the surface of the frame member to achieve locking engagement of the anchor with the frame member; and
   wherein the clevis includes a second end opposite the first end, the second end being adapted to fix the assembly to an extension pole for remote deployment of the assembly, and wherein the clevis first end is slotted to receive a portion of the anchor intended to serve as an articulating attachment point.

9. The anchor assembly of claim 8, further comprising a spring attached at one end to the anchor and at the opposite end to the clevis to hold the anchor in a first position and to allow with application of force the anchor to articulate to a second position during deployment of the assembly.

10. The anchor assembly of claim 8, wherein the clevis second end is threaded to receive a matingly-threaded end of the extension pole.

11. The anchor assembly of claim 8, wherein one or both of the anchor and the clevis includes a set of physical features for attaching other structures to the assembly for use in deployment.

12. The anchor assembly of claim 8, wherein the set of teeth and opening of the anchor are adapted to permit disengagement of the anchor from the frame member and removal of the assembly for later deployments.

13. The anchor assembly of claim 8, wherein the anchor includes an attachment point for connecting the assembly with a pulley system for lifting or lowering a subject.

* * * * *